Figure 1:
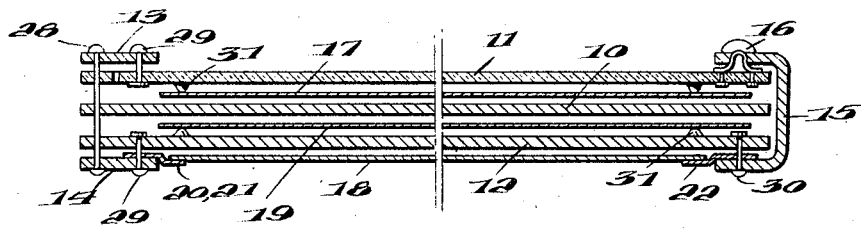

June 23, 1959  O. I. FRANSSON  2,891,326
LUMINOUS CHARTREADING AND ORIENTATION DEVICE
Filed Jan. 18, 1956

INVENTOR
OTTO IVAR FRANSSON,

BY Larson and Taylor

ATTORNEYS

United States Patent Office 2,891,326
Patented June 23, 1959

2,891,326

LUMINOUS CHARTREADING AND ORIENTATION DEVICE

Otto Ivar Fransson, Orebro, Sweden

Application January 18, 1956, Serial No. 560,051

3 Claims. (Cl. 35—62)

The instant invention relates to a chart-reading and orientation device. More in particular, the invention concerns such a device intended for military purposes but which also can be employed for navigational purposes and like usages.

Understandably, chart-reading required illumination. Under military combat conditions, the use of artificial light during chart-reading operations conducted in hours of darkness has the attendant risk that the enemy will detect the chart-reader's position. Even the best screening devices have sometimes proved insufficient.

Chart-reading operations conducted for non-military purposes require that the intensity of the illumination employed not be too strong but on the other hand that this illumination have a color spectrum different from the spectrum of weak light found in the chart-reader's surroundings. If these conditions are not satisfied, the chart-reader is often left dazzled by the chart-reading operation and upon turning away from the chart several minutes are necessary for his eyes to adjust to the weak surrounding light such that he may make further use of the information gained from reading the chart. This experience is particularly disturbing when the operation is undertaken for orientation purposes and the chart-reader is alternately surveying the surrounding countryside and studying the chart.

It has already been proposed, in an effort to meet these problems, that a plate or screen of luminescent material be placed under the chart so as to render the chart readable. Reference should be made to Swedish Patent No. 119,914 in this connection. The luminescent material referred to hereby is understood to be material which, after having been illuminated during a short period by light from a deliberate source such as clear white light or colored light of one kind or another, will during a period immediately thereafter shine with a light having a different spectral character, such as light of a yellow-green character. This latter period usually extends over a plurality of minutes within which sufficient time is available to study the chart.

The chart is placed between the luminescent screen and a transparent plate. The chart may itself be of ordinary paper, but a better result is obtained if the chart paper has been treated to make it more opaque, such as with a resinous oil.

Such devices as these, however, do not fulfill further demands present with military or civilian use for chart-reading operations conducted in darkness. In fact, the covering plate must be made of some highly opaque material in order that the chart be easily legible, and ordinarily of some kind of plastic material, such as Celluloid, artificial glass, or similar material which is smooth on both sides. It is possible to draw on such material with crayon pencils but drawings of this kind have a rather limited duration and furthermore when the drawings become complicated, they may fully cover the chart themselves making it difficult or even impossible to read the chart. It is possible to avoid this by fixing to the covering plate one or more sheets of opaque or semi-opaque paper upon which the necessary markings or notations can be made. Heretofore certain difficulties have been encountered. As pointed out above, the covering plate should have a smooth exterior. And on a smooth plate it is difficult to keep a piece of paper sufficiently still to permit one to make notations and markings which require a high degree of precision.

The present invention takes notice of all of these problems and serves to overcome them in a novel and unique manner. Essentially, the invention involves the use of both sides of the chart casing or covering, one side having a smooth covering sheet or plate, the other side having a matted plate as the covering.

On a matted plate one can draw without difficulty with, for instance, an ordinary lead pencil, and the markings which are left will remain for a satisfactory duration yet will not be difficult to erase. A matted plate also provides sufficient surface friction such that a piece of semi-opaque paper when placed on the plate, will not slide and will therefore facilitate the making of sketches thereon in connection with an underlying chart. Likewise, a plurality of sheets of paper can be used to record, for instance, different circumstances surrounding the chart-reader. The sheets may later be combined, on the basis of indicator marks placed on them, for by placing the sheets under a chart the notation made on them can be transferred to this chart to provide a more permanent record.

Figure 3:
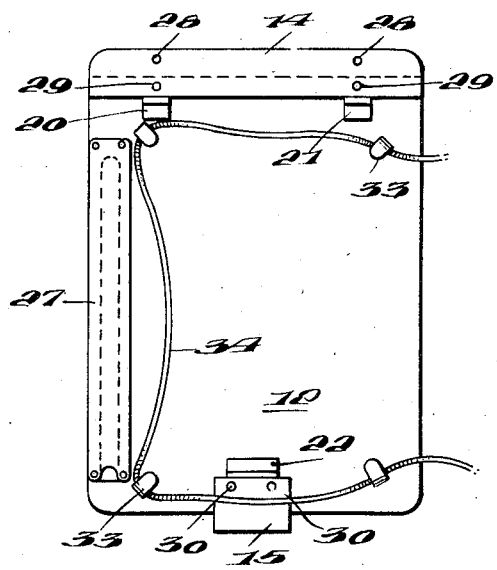
Figure 2:
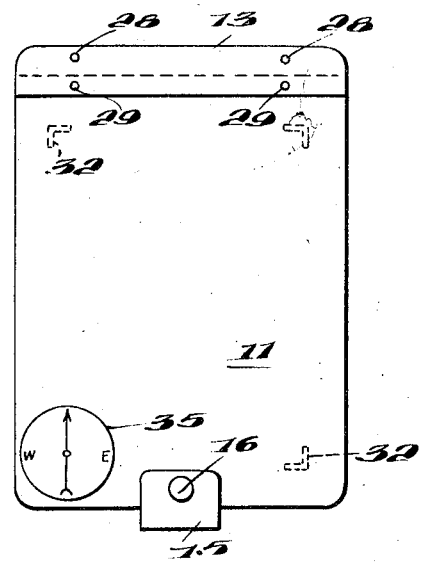
Figure 4:
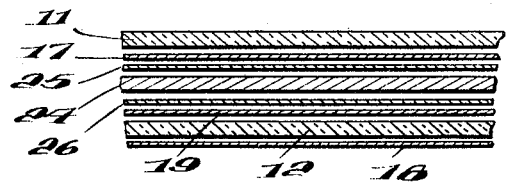

In the attached drawing, two different forms of execution of the present invention are shown. Figure 1, in section, shows a chart-reading and orientation device according to one form of execution. Figure 2 shows a plan view of this device, seen from above and Fig. 3 shows a plan view of the same device, seen from below. Fig. 4 shows a modified form of execution in part.

In Fig. 1 the different parts are shown drawn apart in a vertical direction in order to make the drawing figure more clear. When used in practice, the parts are, of course, arranged with each other much closer than shown in Figure 1. 10 is the screen or plate of luminescent material; 11 the transparent covering plate of smooth material; and 12 the transparent covering plate of matted material. The plates 11 and 12 are combined with plate 10 by means of joints 13 and 14, for instance made from leather. On the other side the plates are held together by means of a latch lock, for instance made from a leather strap 15, fixed to the lower transparent plate 12, and provided with a snap lock 16, which can be fixed to the upper transparent plate 11. A map 17 is introduced between the luminescent screen 10 and the transparent plate 11 and a sheet of paper 18 for making notations is introduced outside the lower transparent plate 12. Another map 19 can be placed between the luminescent screen 10 and the lower transparent plate 12, but it is also possible to remove the map 17 and introduce it in the place of map 19. Fixtures 20, 21, and 22, for instance of thin brassplate, are provided for holding the sheet of paper 18 in place.

It will be evident from the above that the chart can be read from either side of the casing and therefore the chart casing should be so constructed as to be easily opened for reversing the chart. This is necessary if the chart-reader does not have duplicates of the chart available, one of which he can place inside of each of the two covering plates. Ordinarily, only a single luminescent screen or plate is needed between the covering plates such that the chart may be placed between the luminescent screen and one of the covering plates. It may often be desirable, however, to have a specific luminescent screen for each covering plate. The advantages therefrom are many. For example, the luminescent screens may be of different kinds such that the screen inside of the smooth transparent plate will give a somewhat stronger degree of illumination for reading charts having a high degree of detail. In such a case the period of illumination may be short. The second screen can be of lesser intensity since on this side notations and drawings are to be made, but in this case illumination will have to occur for a longer period.

Under other circumstances, it may be preferable to place a reflector screen behind one or both of the luminescent screens. Or in another embodiment of the invention, where two luminescent screens are employed, the reflector screen can be fixed to the back side of one of the luminescent screens. In such a case, both the luminescent screen and the intermediate reflector screen can be combined into a single unit whereby the risk of losing one or more of the plates and screens in question is decreased accordingly.

Figure 4 shows part of section through a modified arrangement. In accordance with the above the upper transparent plate is indicated 11 and the lower transparent plate is indicated 12. The luminescent screen, however, is replaced by the metal plate 24, and two different luminescent screens of different character, a luminescent screen 25 being placed between the metal screen 24 and the upper chart 17, and a luminescent screen 26 being placed between the same metal plate 24 and the lower chart 19. In the same way as indicated in Figure 1, there may be a sheet of paper 18 placed in contact with the lower transparent plate 12, so that notations may be made in connection with the reading of the chart 19.

Certain appurtenances can also be included according to the invention. For example, on the side of the chart casing which is provided with a smooth transparent plate, an orientation compass 35 of some known kind can also be provided. This should suitably be furnished with a turnable compass scale in order to carry out direction orientation. In some instance it may be necessary furthermore to make the fixture for the compass displaceable when determining its angular position.

A pencil pocket, such as that indicated at 27 in Figure 3, can also be provided on the matted plate side of the chart casing.

In view of the fact that a compass is preferably used in connection with the chart-reading device of the invention, all of the parts therein, especially the fluorescent screens, should be made of some anti-magnetic material. Accordingly, all joining members and locks, are made of some non-ferrous material, such as animal skin, leather, plastic, or some similar material. The covering plates are held together along one edge by means of a strip of leather or such material which is riveted to each of the plates with non-magnetic rivets, such as those made of brass. At the opposite side of the chart a locking arrangement is provided, also of non-magnetic material.

Thus, in Figure 1, there are a couple of rivets 28, holding all of the device together, which are made of brass. Similarly, the rivets 29 which combine the upper transparent screen and the lower transparent screen, respectively, with the joints 13 and 14, are also made of brass material. The same also applies to the rivets 20, by which the strap lock 15 is fixed to the lower transparent screen 12.

The invention also contemplates that, in lieu of separate luminescent and mat plates, the matted plate itself may carry the luminescent material on its inward turned surface.

Other details serve to fill out the inventive concept herein. For example, flexible tape or rubber dies 31 can be provided for retaining the chart in its position within the chart casing when the casing has been collapsed. Moreover, illuminating points or direction lines 32 can be placed on both sides thereof, the lines coinciding with the meridian direction and or with the parallel direction for facilitating orientation and as an aid for positioning the chart within the casing. Four eyelet like fixtures 33 for the chart strap 34 provide means through which the strap may run freely to form a closed ring. This can also provide means for carrying the entire device. Furthermore, when one of the four branches of the strap is drawn out to sufficient length for carrying purposes, it is also possible that the chart-reader can use this as means for immediately orienting the chart. Thus, in the dark one will known whether the south edge is turned to him, or otherwise.

Although the invention has been described in considerable detail with reference to certain preferred embodiments thereof, it will be understood that variations and modifications can be effected without departing from the spirit and scope of the invention as described hereinabove and as defined in the appended claims.

What is claimed is:

1. A chart reading and marking device comprising in combination, a transparent upper plate, at least one luminescent internal plate, and a transparent lower mat plate, hinge means connecting said plates, means for holding a transparent chart between said upper and luminescent plates, and means for holding a transparent sheet for marking below said mat plate, said upper disc being clear and polished for extreme transparency, said lower plate having a mat outer surface suitable for holding said marking sheet.

2. A chart reading and marking device as claimed in claim 1 and comprising two of said luminescent plates, and a reflecting central plate interposed between said luminescent plates.

3. A chart reading and marking device as claimed in claim 1, and further comprising means for holding a transparent chart between said luminescent plate and said mat plate.

References Cited in the file of this patent

UNITED STATES PATENTS

| | | |
|---|---|---|
| 93,120 | Pritchard | July 27, 1869 |
| 1,351,935 | Willis | Sept. 7, 1920 |
| 1,373,783 | Willis | Apr. 5, 1921 |
| 2,199,311 | Hartmann | Apr. 30, 1940 |
| 2,334,766 | Hermann | Nov. 23, 1943 |
| 2,451,979 | Rosenblum | Oct. 19, 1948 |
| 2,516,727 | Schultheiss | July 25, 1950 |
| 2,676,818 | Blumberg | Apr. 27, 1954 |

FOREIGN PATENTS

| | | |
|---|---|---|
| 240,062 | Germany | Apr. 29, 1911 |
| 15,793 | Great Britain | Nov. 25, 1893 |
| 238,351 | Great Britain | Aug. 20, 1925 |
| 119,914 | Sweden | Oct. 14, 1947 |